United States Patent [19]
Asano et al.

[11] 3,835,950

[45] Sept. 17, 1974

[54] APPARATUS FOR CONTROLLING THE SPEED AND SPACING OF VEHICLES

[75] Inventors: Tetsumasa Asano; Hiroshi Takamiya; Yoshinobu Morimoto, all of Himeji, Japan

[73] Assignee: Mitsubishi Denki Kabushiki Kaisha, Tokyo, Japan

[22] Filed: Sept. 25, 1972

[21] Appl. No.: 291,621

[30] Foreign Application Priority Data

| Sept. 23, 1971 | Japan | 46-74309 |
| Oct. 26, 1971 | Japan | 46-84925 |
| Oct. 28, 1971 | Japan | 46-85857 |
| Dec. 1, 1971 | Japan | 46-96956 |
| Oct. 23, 1971 | Japan | 46-84201 |
| Oct. 26, 1971 | Japan | 46-84923 |
| Oct. 27, 1971 | Japan | 46-85290 |
| Oct. 27, 1971 | Japan | 46-85289 |
| Oct. 29, 1971 | Japan | 46-86127 |
| Oct. 29, 1971 | Japan | 46-86126 |

[52] U.S. Cl. ............. 180/98, 246/467 D, 318/587, 340/33
[51] Int. Cl. .............................................. B60t 7/18
[58] Field of Search ......... 180/98; 318/587; 340/32, 340/33; 246/167 D

[56] References Cited
UNITED STATES PATENTS
3,078,944  2/1963  Gray .................. 180/98

Primary Examiner—Robert B. Reeves
Assistant Examiner—Thomas E. Kocovsky
Attorney, Agent, or Firm—Oblon, Fisher, Spivak, McClelland & Maier

[57] ABSTRACT

The fail-safe system for controlling separate vehicles running on a track, path or roadway permits both high vehicle speeds and high traffic densities. The system includes devices for measuring the speed of a lead vehicle and also the spacing between vehicles. A control system is provided which develops a control signal proportional to the square root of the sum of a signal proportional to the vehicle spacing and a signal proportional to the square of the lead vehicle speed. Alternatively, the control system may provide a control signal proportional to the sum of signals proportional to the lead vehicle speed and to the square root of the vehicle spacing. These control signals are used to regulate the speed and following distance of vehicles behind the lead vehicle. Various other alternative embodiments of the invention are disclosed, as are several novel features such as an emergency braking system.

12 Claims, 16 Drawing Figures

APPARATUS FOR CONTROLLING THE SPEED AND SPACING OF VEHICLES

BACKGROUND OF THE INVENTION

1. Field Of The Invention

This invention relates to an apparatus for controlling vehicles, and more particularly to an apparatus for controlling speed and separation among a plurality of vehicles. The apparatus is particularly suitable for controlling relatively small vehicles in a crowded environment.

2. Description Of The Prior Art

Heretofore systems and apparatuses for controlling vehicle spacing and speed in relatively crowded environments have been disclosed. However in conventional systems of this type, the vehicle speed is controlled depending only upon the distance to a forward or lead vehicle. In such cases disadvantages arise in that high speed movement cannot be attained without a large space or distance between vehicles. Accordingly, the number of vehicles passing a particular point in a speficied time, i.e., the traffic density, decreases as a function of increasing vehicle speed.

SUMMARY OF THE INVENTION

Accordingly, one object of this invention is to provide a novel apparatus for controlling vehicles wherein both high vehicle speeds and high traffic densities are maintained.

Another object of this invention is to provide a novel apparatus for controlling a plurality of separate vehicles which allows high vehicle speeds with minimal vehicle spacing.

A still further object of this invention is the provision of a novel apparatus for controlling vehicles which permits high vehicle speeds and traffic densities and yet is extremely safe and reliable.

Briefly, these and other objects and features of this invention are attained by providing an apparatus for controlling vehicles which includes an electronic device for measuring the distance between a forward or lead vehicle and a following vehicle, and an electronic means for measuring the speed of the forward vehicle. A control system is also included for providing the square root of the sum of a value proportional to the vehicle spacing and a value proportional to the square of the speed of the forward vehicle. A speed controller is included for regulating a vehicle driving device or motor so as to set the speed of the following vehicle at an appropriate level corresponding to the output of the control system. Thus, the speeds of the forward vehicle and the following vehicle are regulated in accordance with the following equation, and the distance between the vehicles is maintained at a value corresponding to the differential distance required for damping or stopping both vehicles:

$$V_2^2 = \alpha V_1^2 + \beta(L-L_o) \quad (1)$$

wherein $V_2$ represents a speed of the following vehicle (m/sec), $V_1$ represents a speed of the forward vehicle (m/sec), $L$ represents a distance or spacing between vehicles (m), $L_o$ represents a minimum safe distance (m), $\alpha$ represents a constant ($\alpha < 1$) and $\beta$ represents a constant.

As it is clear from the above equation, when both of the vehicles are stopped and $V_1 = V_2 = 0$, the vehicle spacing L equals the minimum safe distance $L_o$. When both the vehicles run at an equal speed $V$ (m/sec), the following equation applies:

$$V_2 = \beta/1 - \alpha \ (L-L_o).$$

The vehicle spacing at equal vehicle speed is longer than the value corresponding to the differential distance for damping both vehicles which is proportion to the speed of the vehicles. The constants $\alpha$ and $\beta$ are determined by the above equation.

In practical operation, the speed reduction of the following vehicles is started after a control response delay time starting when the speed of the forward vehicle is reduced. A running or traveling distance proportional to the speed of the following vehicle is then determined. Accordingly, the speed of the following car is decreased based on this distance. An appropriate decrease in speed can be attained by simple calibration of the control circuit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
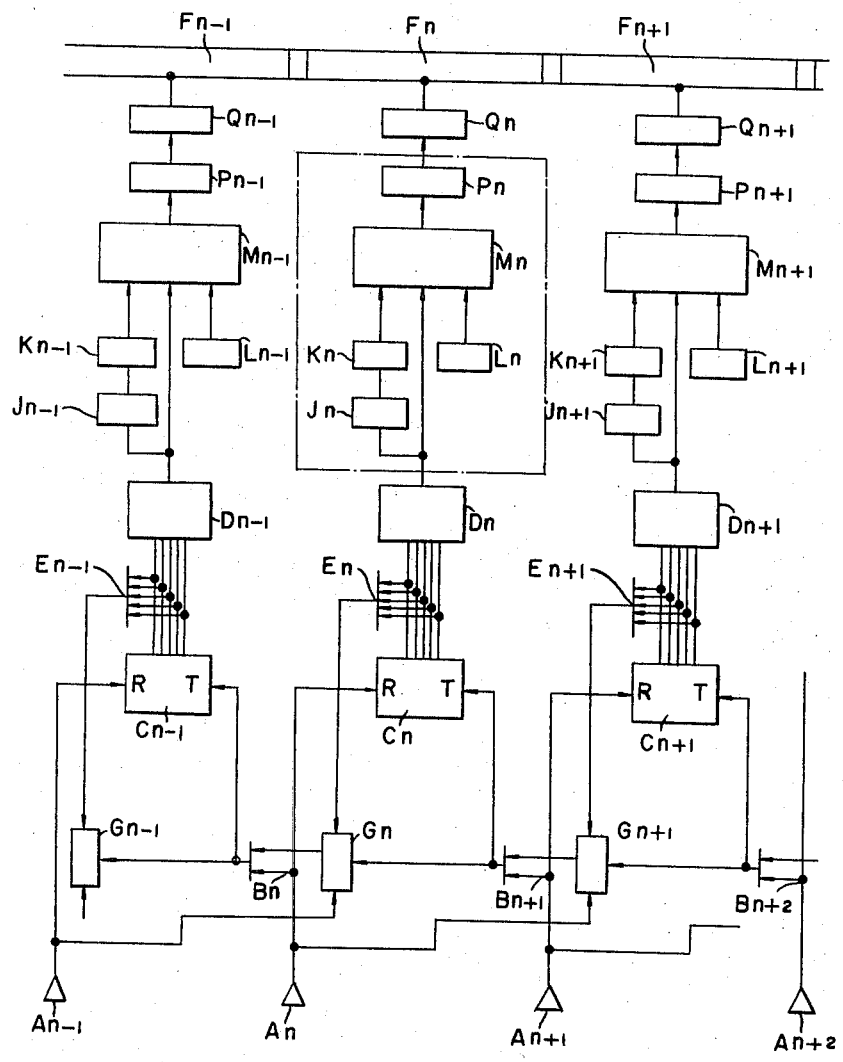
FIG. 1 is a schematic diagram of one embodiment of the apparatus for controlling vehicles according to this invention.

Referring now to the drawings, wherein like reference numerals generally designate identical or corresponding parts throughout the several views, and more particularly to FIG. 1 thereof, one embodiment of the apparatus of the present invention for controlling vehicles, which may be referred to as cars throughout the specification, is shown wherein $A_n$ designates a ground element such as a magnetic proximity switch, a plurality of which are placed at specific intervals along the track, path or roadway (not shown). Similarly, $B_n$ designates an OR gate generating a theoretical sum output upon the reception of a signal from the ground element $A_n$ and the output signal of a gate $G_n$. In addition, $C_n$ designates a counter wherein the counting input T is the output signal of OR gate $B_{n+1}$), and the reset input R is the signal from the ground element $A_n$. The symbol $E_n$ designates an OR gate having as its inputs each output bit of the counter $C_n$ and $G_n$ designates a gate controlled by the output of the OR gate $E_n$ and by the signal from the ground element $A_{n-1}$. The output of the OR gate $E_n$ is zero after receiving the signal from the ground element $A_{n-1}$), and the output of the OR gate $B_{n+1}$) is not transmitted to the OR gate $B_n$ until a new output is generated. The symbol $D_n$ designates a digital-to-analog DA converter having as inputs each output bit of the counter $C_n$. Similarly, $J_n$ designates a differentiating circuit device operating on the rate of change of the output of the converter $D_n$ and $K_n$ designates a squaring circuit having its input provided from the output of the differentiating circuit $J_n$. In addition $L_n$ designates a constant voltage device providing negative bias, while $M_n$ designates an addition circuit for summing the outputs of said squaring circuit $K_n$, said converter $D_n$ and said constant voltage device $L_n$. The symbol $P_n$ designates a square root operator for calculating the square root of the output of the addition circuit $M_n$ and $Q_n$ designates a clipper for controlling the output of the square root operator $P_n$. Furthermore $F_n$ designates a conductive segment on which the output voltage of the clipper $Q_n$ is impressed. A plurality of the conductive segments $F_{n-1}$, $F_n$, $F_{n+1}$... are respectively insulated from one another and arranged in one line along a selected track, path or roadway.

Figure 2:
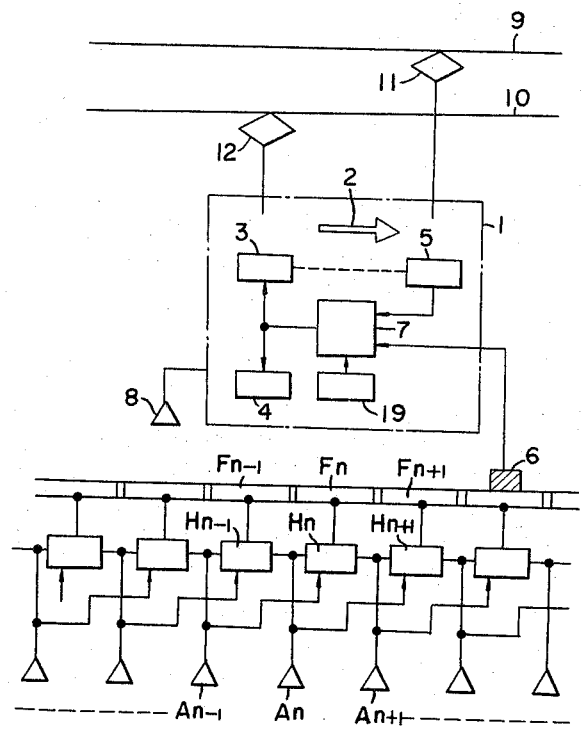
FIG. 2 is a schematic diagram of a control system employing the apparatus of FIG. 1.

FIG. 2 shows a schematic diagram of a control system wherein $H_n$ designates a control device including all of the devices and circuits shown in FIG. 1 between the ground element $A_n$ and the conductive segment $F_n$. The reference numeral (1) designates a car running in the direction of an arrow 2 on a track, path or roadway (not shown in drawing). The numeral 3 designates a driving device or motor in the car 1, and 4 designates a damper or brake. The numeral 5 designates a speed dynamo which generates an output proportional to the speed of the car and 6 designates a receiver such as a brush which is fitted to the front of the car so as to respectively contact the segments $F_i$ ($I$ = 1, 2... $n$−1, $n$, $n$+1...). The numeral 7 designates a speed controlling device for comparing the output voltage of the receiver 6 with the output voltage of the speed dynamo 5 and controlling the driving device 3 and the damper 4 so as to regulate the speed in response to the voltage from the receiver 6. The numeral 19 designates an increase and decrease speed pattern generator for controlling the speed controlling device 7 so as to keep the speed of the car in a specific speed range. The numeral 8 designates a car element, such as a metal piece fitted on the back of the car, for facing or closely approaching the ground elements $A_i$ ($i$ = 1, 2...$n$) respectively and (9) and (10) designate feeder or power lines, 11 and 12 designate current collectors connected to the feeder lines.

In operation of the system illustrated in FIGS. 1 and 2, when the car 1 runs so that the car element 8 approaches and faces the ground element $A_{n-1}$, the ground element $A_{n-1}$ detects the presence of the car and generates a signal indicating the passage of the car. The gate $G_n$ is closed by this signal and the counter $C_{n-1}$ is also reset so that the output of the OR gate $E_{n-1}$ is zero. Accordingly, the signal which would pass from the OR gate $B_{n+1}$ through gate $G_n$, OR gate $B_n$, gate $G_{n-1}$ to the OR gate $B_{n-1}$ (not shown) is stopped by the closed gate $G_{n-1}$ and the closed gate $G_n$.

When the car element 8 faces the ground element $A_n$ due to movement of the car, the signal of the ground element $A_n$ is passed through the OR gate $B_n$ to drive the counter, $C_{n-1}$, and the gate $G_{n-1}$ is opened by generation of an output from the counter $C_{n-1}$. Accordingly, the signal from the ground element $A_n$ is passed through the gate $G_{n-1}$ and the OR gate $B_{n-1}$ so as to sequentially drive the counters positioned behind the ground element $A_n$, i.e., counters previously passed by the car. The counter $C_n$ is also reset and the gate $G_{n+1}$ is closed. Accordingly as the car and car element 8 progressively moves, the output of the counter $C_i$, corresponding to the ground element $A_i$, is zero, but the counters behind the counter $C_i$ respectively have an output which is progressively 1 count higher depending upon the distance behind the car. The relationship of the output of the counter is represented graphically in FIG. 3.

Figure 3:
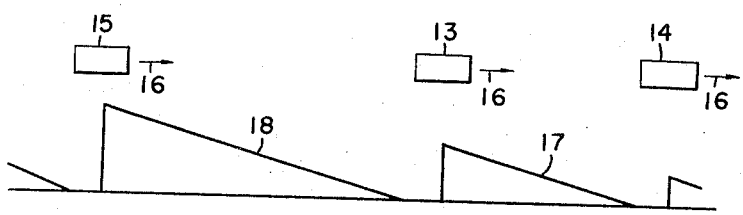
FIG. 3 is a graphical diagram illustrating the operating characteristics of the control system of FIG. 2.

In FIG. 3 a forward or lead car 14, a following car 13 and a rear car 15 are shown. When the lead car 14, the following car 13 and the rear car 15 run in the direction of the arrow 16 the analogue converted value of the output of the counters located between the cars is increased depending upon the car spacing as shown by the ramp lines 17 and 18.

The differential of the output of the converter $D_n$, which is proportional to the distance from the forward car, is proportional to the speed of the forward car. The square of this value is applied to the addition device $M_n$. The value proportional to square of the speed of the forward car, the value proportional to the car spacing and the negative bias value of the constant voltage device $L_n$ are added by the adding circuit $M_n$, and the square root of this sum is obtained by the square root operator $P_n$, thereby providing a value proportional to the allowable speed $V_2$ of the following car, as shown in the equation 1. The value of this signal is previously limited, depending upon the static road condition, by the clipper $Q_n$ in order to limit the car speed depending upon whether the track, path or road is straight or curved.

When the car running speed signal is impressed on the conductive segment $F_i$ and is transmitted to the car by the receiver 6, the signal voltage is compared with the voltage of the speed dynamo 5 and the speed of the car is controlled so the two voltages are equal. Increases and decreases in the speed of the car, especially the upper limit speed, are accurately controlled by the speed pattern generator 19.

As mentioned above, the apparatus of the present invention includes a means for detecting car spacing including the speed dynamo 5 for detecting car speed, the car element 8, the ground elements $A_i$ the counters $C_i$, the OR gates $B_i$ and $E_i$, the gates $G_i$ and the DA converters ($D_i$). The apparatus of the present invention further includes means for detecting the speed of a forward car including the differential circuit device $J_n$, and also includes means for controlling car operation including the squaring circuit $K_n$, the adding circuit $M_n$ and the square root operator $P_n$. The car spacing can be controlled relative to the car speed by this means.

Various modifications of the means described above are possible. For example, when car speed depending upon the straight or curved nature of the path, road or track is provided by a device such as program control system, or an equivalent thereof, the clipper $Q_n$ is unnecessary. In the latter case, when the device for controlling car speed is put on the car instead of in the ground instrumentation, the cost of the system can be decreased. If the clipper is eliminated, however, the output of each of the DA converters $D_i$ is directly impressed on the conductive segments $F_i$. Accordingly, the differential value of the signal received by the receiver 6 on the car is used to detect the relative speed of cars, $V_1 - V_2$. The speed of the forward car ($V_1$) can be obtained by adding said relative speed ($V_1 - V_2$) to the speed of the following car ($V_2$).

In accordance with the apparatus of this invention, great economies, improved efficiency and a substantial reduction in labor are provided by the transportation of smaller cargoes or fewer persons to a single destination on each car in comparison with systems wherein larger cargoes or larger numbers of people are transported to different destinations on one large car. Moreover, many cars can be moved on a track having a specific capacity to provide an economical and practical transportation system.

In accordance with the above described embodiment, the following specific exemplary figures demonstrate the advantages of the present invention over conventional systems. If, for example, the car spacing is 40 m when the forward car speed is 50 km/H and the following car speed is 60 km/H., the spacing car is also 40 m when the forward car speed is 10 km/H and the following car speed is 20 km/H, in conventional systems, since the relative speed remains the same. However, in accordance with this invention, even if the relative car speed is same, the car space distance is decreased at low speeds, thereby increasing the traffic density without comprising the safety of the system. This effect can be understood by inserting the car speeds $V_1$ and $V_2$ into equation 1.

As stated above, the apparatus of this invention provides an effective system for permitting high density movement of vehicles or cars so that track or roadway construction costs for handling a given traffic capacity can be minimized.

Figure 4:
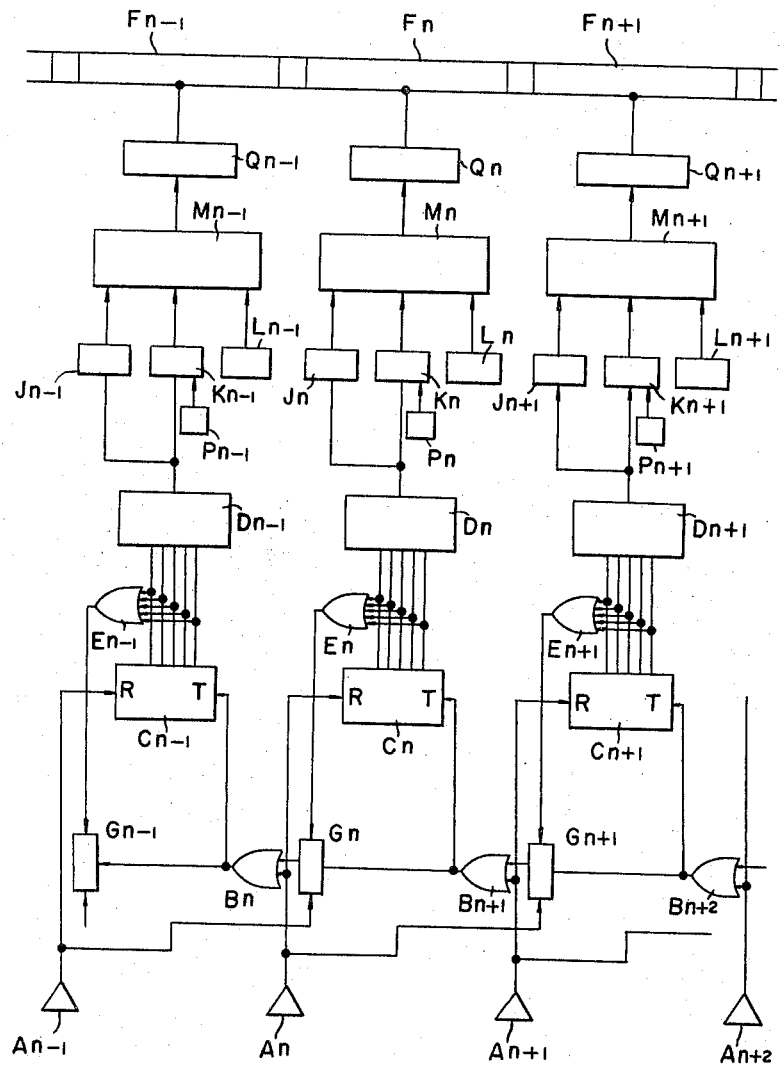
FIGS. 4, 5, 6 and 7 are respectively schematic diagrams of other embodiments of the apparatus according to this invention.

Another embodiment of the present invention, which includes means for determining the approximate value of car speed, and means for limiting differences in deceleration using the damping device in each car, is shown in FIG. 4. Before referring to FIG. 4, attention is directed to equation 2, which is a slight variation of equation 1:

$$(V^2_2)/2\,\alpha_2 - (V^2_1)/2\,\alpha_1 = L - L_o... \quad (2)$$

wherein $V_2$ is the speed of the following car (m/sec.), $V_1$ is the speed of the forward car (m/sec.),
$L$ is the car spacing (m),
$L_o$ is the minimum safe distance (m),
$\alpha_2$ is the lower limit deceleration (m/sec.$^2$) and
$\alpha_1$ is the upper limit deceleration (m/sec.$^2$).

The speed of the following car $V_2$ can be obtained from equation 2 as follows:

$$V_2 = \sqrt{(\alpha_2)/\alpha_1)\,V_1^2 + 2\alpha_2(L - L_o)} \quad (2')$$

The equation 2' can be approximated as follows:

$$V_2 + V_2{}^* = \alpha_2/(\alpha_1)\,V_1 + \sqrt{2\alpha_2/\alpha_1\,(\alpha_1 - \alpha_2)\,L - L_o} \quad (3)$$

In the approximate equation 3, the safety factor is considered by comparison with the original equation 2'. It is always true that $V_2 \geqq = V_2{}^*$, as is clear from the following equations:

$$V_2^2 - V_2{}^{*2} = \alpha_2/\alpha_1\,V_1^2 + 2\alpha_2(L - L_o)$$

$$= (\alpha_2/\alpha_1\,V_1)^2 - 2\alpha_2/\alpha_1\,V_1\,\sqrt{2\alpha_2/\alpha_1(\alpha_1 - \alpha_2)}\,\sqrt{L - L_o})$$

$$= 2\,\alpha_2/\alpha_1\,(\alpha_1 - \alpha_2)\,(L - L_o)$$

$$= (\sqrt{\alpha_2/\alpha_1(1 - \alpha_2/\alpha_1)}\,V_1 - \sqrt{2\alpha_2\,\alpha_2/\alpha_1}\,\sqrt{L - L_o})^2$$

$$\geqq 0 V_2 \geqq V^*_2$$

When both cars run at the same speed $V$ (m/sec.), the car spacing can be shown by substituting $V_1 = V_2 = V$ in either equation 2 or 2':

$$L - L_o = \alpha_1 - \alpha_2/2\,\alpha_1\,\alpha_2\,V^2 \quad (4)$$

When both cars run at the same speed $V_1 = V_2{}^* = V$, the car spacing can be shown to be the same as in equation 4 using the approximate equation 3. Accordingly, the traffic capacity when the cars run at the same speed is the same in both equation 2' and the approximate equation 3. It is therefore clear that the approximate equation can be safely applied.

Particularly when there is no damping or slowing of the following car, it is safe to subtract a specific value from the right portion of both equations 2' and 3. The equation 3 can thus be modified to:

$$V_2{}^* = \alpha_2/\alpha_1\,V_1 + \sqrt{2\,\alpha_2/\alpha_1\,(\alpha_1 - \alpha_2)}\,\sqrt{L - L_o - K} \quad (3')$$

Instead of subtracting the constant $K$, the safety distance $L_o$ can be increased. In the embodiment shown in FIG. 4, the operational circuit is based on equation 3' above.

In FIG. 4 substantially all elements are as shown in FIG. 1. The OR gates $E_n$ and $B_n$ have been illustrated by a different symbol, but still operate in the same manner as those illustrated in FIG. 1. However the squaring circuit $K_n$ of FIG. 1 has been removed, as has the square root operator $P_n$. In place of these circuits a square root operator $K'_n$ has been added to the FIG. 4 embodiment between the DA converter $D_n$ and the adding circuit $M_n$. In addition, another negative bias source $P_n$ has been added to the square root operator $K'_n$ to set the minimum safe car separation distance.

The operation of the embodiment of FIG. 4 is generally similar to that of FIG. 1, but will be fully described for purposes of clarity. When the car 1 runs so that the car element (8) approaches and faces the ground element $A_n{}^-_1$, the ground element $A_n{}^-_1$ detects this fact and generates a signal indicating the passage of the car. The gate $G_n$ is closed by this signal and the counter $C_n{}^-_1$ is reset to zero by the output of the OR gate $E_n{}^-_1$. Accordingly, the signal passing from the OR gate $B_{n-1}$ through gate $G_n$, OR gate $B_n$ and gate $G_n{}^-{}_1$ to the OR gate $B_n{}^-{}_1$ (not shown) is stopped or cut-off by the closed gates $G_n{}^-{}_1$ and $G_n$.

When the car element 8 faces the ground element $A_n$ the signal of the ground element $A_n$ is passed through the OR gate $B_n$ so as to drive the counter $C_n{}^-{}_1$, and the gate $G_n{}^-{}_1$ is opened by generation of an output from the counter $C_n{}^-{}_1$. Accordingly, the signal of the ground element $A_n$ is passed through the gate $G_n{}^-{}_1$ and the OR gate $B_n{}^-{}_1$, so as to continuously drive counters located to the rear of the car. The counter $C_n$ is also reset and the gate $G_{n+1}$ is closed. Thus, counters to the rear of the counter $C_i$ have outputs progressively 1 count higher, depending upon the distance from the car. The DA converter then converts the counter output to a signal proportional the distance from the lead car. The differential of this equal is proportional to the speed of the lead car. The differential signal value, the signal the value proportional to the square root of the DA output minus the minimum safe distance signal, and the negative bias value provided by the constant voltage device $L_n$ are added by the adding circuit $M_n$. A value proportional to the allowable speed $V_2{}^*$ of the following car as shown in equation 3' is thus obtained. This value, as previously described, is limited by the clipper $Q_n$ in order to regulate the car speed depending upon the straight or curved nature of the track or roadway.

Building an apparatus using the equation 3 is quite simple and economical in comparison with building an apparatus using the equation 2. This economy is justified since the approximate value is almost the same as the value of the equation 2. Accordingly, there is no difficulty in practice in deciding the car speed using the approximate equation 3.

Figure 5:
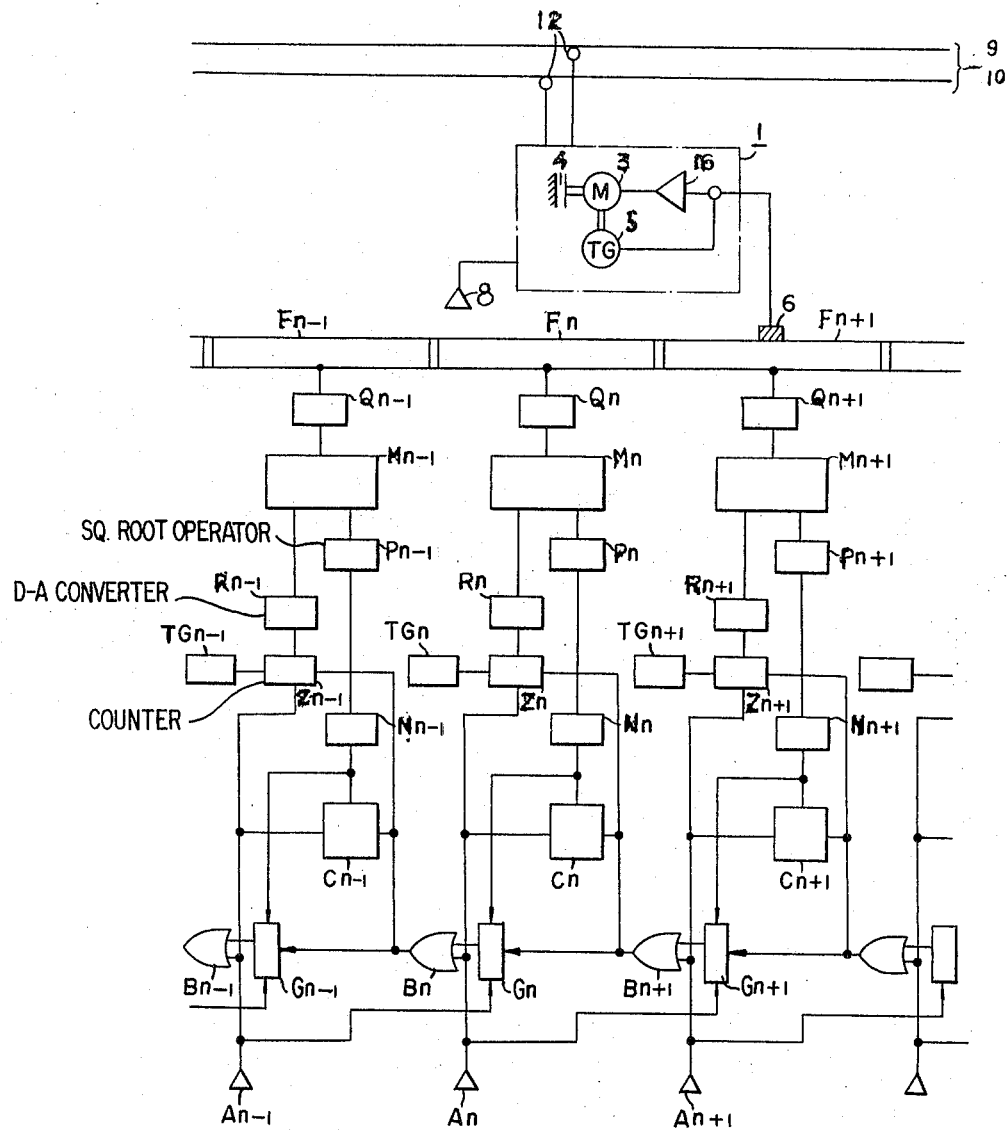

Another embodiment of the present invention is shown in FIG. 5. In FIG. 5, the reference numeral 1 designates a car, 3 designates a driving device or motor for the car 1 and 4 designates a damping or braking device for the car 1. The numeral 5 designates a speed dynamo or tachometer generator for the car 1 and 16 designates an amplifier while 6 designates a receiver fitted to the front of the car. The numeral 8 designates the car element, such as a metal piece fitted to the back of the car, and 12 designates a collector contacting a pair of power or feed lines 9 and 10. In FIG 5, the reference symbols $A_n$, $B_n$, $C_n$, $D_n$, $G_n$, $F_n$, $M_n$ and $Q_n$ are respectively the same as in FIG. 1. The reference symbol $Z_n$ designates a counting device for counting the number of output pulses from the ground element $A_{n+1}$ and is reset by output pulses from the ground element $A_n$ and is transmitted through the OR gate $B_{n+1}$, depending upon the setting time of a timer $TG_n$. The symbol ($R_n$) designates a DA converter having as an input the output of the counting device $Z_n$ and $P_n$ designates a square root operator having as its input the output of a DA converter $N_n$. The addition circuit $M_n$ adds the output of the DA converter $R_n$ and the square root operator $P_n$. The operation of the embodiment of FIG. 5 will now be described in detail. When the car element 8 faces the ground element $A_{n-1}$, the control gate $G_n$ is closed by the reception of a signal from the ground element $A_{n-1}$, and the counter $C_{n-1}$ is reset to a zero output while the counting device $Z_{n+1}$ is also reset. When the car element 8 faces the ground element $A_n$ due to movement of the car, the control gate $G_{n+1}$ is closed by the reception of a signal from the ground element $A_n$ and the counter $C_n$ and the counting device $Z_n$ are reset. Simultaneously, the counter $C_{n-1}$ and the counting device $Z_{n-1}$ are driven by the signal passing through the OR gate $B_n$. The control gate $G_{n-1}$ is opened by the signal emanating from the counter $C_{n-1}$. Counters to the rear of the car are consequently driven by the signal passing the OR gate $B_n$, the control gate $G_{n-1}$ and the OR gate $B_{n-1}$. As the car element (8) is progressively moved, the output of the counter $C_n$ corresponding to the ground element $A_n$ is zero. The counters to the rear of the counter $C_n$ respectively have outputs progressively 1 count higher depending upon the distance behind the car. The output of the counter $C_n$ is converted to an analog voltage by the DA converter $N_n$, and this voltage corresponds to the distance from the forward or lead car.

In addition, the timer $TG_{n-1}$ is actuated at the same time, feeding a signal to the counting device $Z_{n-1}$ whereby the input of the counting device $Z_{n-1}$ is opened during the set time of the timer $TG_{n-1}$. The input of the counting device $Z_{n-1}$ is same as the input of the counter $C_{n-1}$, and is fed through the OR gate $B_n$. When the car element 8 is moved so as to progressively face the ground elements $A_n$, $A_{n+1}$... the value stored in the counter is increased at the rate of 1 count for each ground element during the set time of the timer $TG_{n-1}$. The output of the counting device $Z_n$, operating during the set time of the timer $TG_n$, is converted to an analog voltage by the DA converter $R_n$, and this voltage corresponds to the speed of the forward or lead car. The square root of the output of the DA converter $N_n$ is calculated by the square root operator $P_n$. The resulting value is added to the output of the DA converter $R_n$ by the adding circuit $M_n$, thereby summing the square root of the value corresponding to the car spacing and the value of car speed. This sum is passed through the clipper $Q_n$ to the conductive segment $F_n$. The receiver 6 of the car 1 contacts the conductive segment $F_{n+1}$ and receives a voltage corresponding to the distance from the forward or lead car and the speed of the forward car. This voltage is fed through the amplifier 16 to the driving device 3 so as to control the device 3. The output voltage of the speed dynamo or tachometer generator 5 is fed back to the input of the amplifier 16 to provide feed-back control. The driving device 3 is thus controlled to regulate the car speed corresponding to the voltage impressed on the conductive segment.

In the present embodiment, the car speed is limited by the clipper. It is possible to control the car speed limit by using other devices, such as a program controller, as described above. In the present embodiment, the car element may be constructed of a metal piece, and the ground element of a magnetic proximity switch. Alternatively, a pair of photoelectric switches may be employed instead of the magnetic proximity switch. The car element may then be a shutter plate. In both cases, the car itself can serve as the car element.

The information regarding the speed of the forward car may also be obtained by employing a device for storing the value of the output of the counter $Z_n$ during the specific set time of the timer without employing a counter for detecting the speed of the forward car.

As stated above, in accordance with this invention, a car spacing control system using information as to the distance to a forward or lead car as well as the information as to the speed of the forward car is provided, whereby the dense movement of cars can be attained.

In order to obtain the information as to the speed of the forward car, an output corresponding to the car spacing is utilized without directly obtaining information as to the speed of the forward car. Accordingly, it is unnecessary to employ a device for transmitting information as to the speed of the forward car, whereby the apparatus of the present invention can be simplified.

Figure 6:
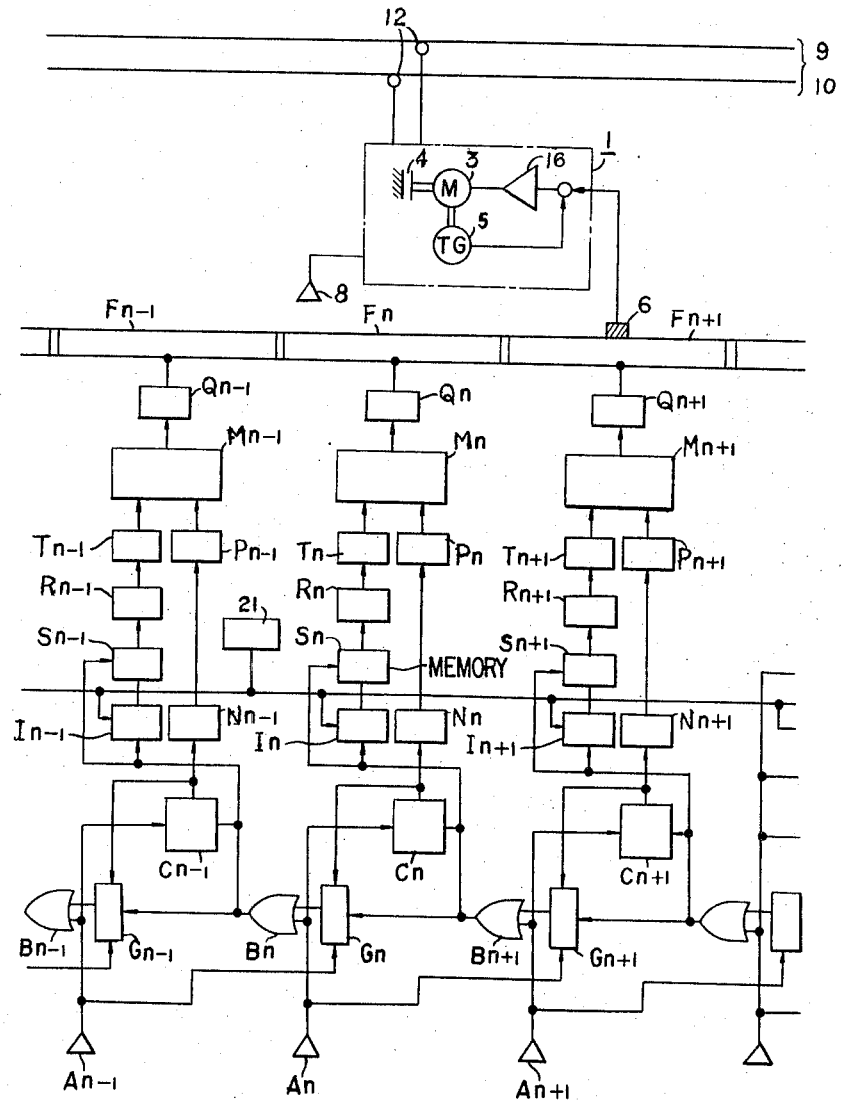

Another embodiment of the present invention shown in FIG. 6 which further comprises an oscillator for generating a constant periodic signal having a period shorter than that of the car passing signal generated by the ground elements. A counter for repeatedly counting the signals from the oscillator during the time of each car passing signal is also provided. A memory device is included for storing maximum counts of the counter.

Referring now to FIG. 6, the reference numeral 21 designates an oscillator and $I_n$ designates a counting device for count-controlling the output of the oscillator 21 using an output pulse from the ground element $A_{n+1}$. The symbol $S_n$ designates a memory device, which is controlled by an output pulse from the ground element $A_{n+1}$, for storing the output of the counting device $I_n$. The DA converter $R_n$ receives its input from the output of the memory device $S_n$. The symbol $T_n$ designates an inverter, and the remaining components are the same as in FIG. 5.

The operation of the embodiment of FIG. 6 will now be described in detail. As previously stated, when the car element 8 faces the ground element $A_{n-1}$, the control gate $G_n$ is closed by the reception of a signal from the ground element $A_{n-1}$, and the counter $C_{n-1}$ is reset to zero. When the car element 8 faces the ground element $A_n$ as the car moves, the control gate $G_{n+1}$ is closed by the reception of a signal from the ground element $A_n$, the counter $C_n$ is reset to zero, and simultaneously the counter $C_{n-1}$ is driven by the signal passing through the OR gate $B_n$. Accordingly, the control gate $G_{n-1}$ is opened by the signal generated by the counter $C_{n-1}$ and counters to the rear of the car are consequently driven by the signal passing through the OR gate $B_n$, the control gate $G_{n-1}$ and the OR gate $B_{n-1}$. As the car element 8 progressively moves, the output of the counter $C_n$ corresponding to the ground element $A_n$ is zero. The counters to the rear of the counter $C_n$ respectively have outputs progressively 1 count higher depending upon the distance behind the car.

The output of the counter $C_n$ is converted to an analog voltage by the DA converter $N_n$, and this voltage corresponds to the distance to the car. The ground elements $A_n$ are placed at specific intervals, and each ground element generates an output pulse corresponding to the passing of each car element 8. This output pulse has a duration which is proportional to the speed of the car. The oscillator 21 then generates a constant periodic pulse signal having a period shorter than that of the output pulse. The number of pulses generated by the oscillator 21 during the duration of the output pulse from the ground element $A_n$ varies depending upon the speed of the car 1. The number of pulses from the oscillator 21 can thus be used to provide car speed information.

The signal of the ground element $A_n$ is also transmitted to the counting device $I_n$ and to the memory device $S_n$ whereby the output of the oscillator 21 driving the counting device ($I_n$) is stopped for a while, and the memory device $S_n$ stores the maximum count of the counting device $I_n$. The memory output is transmitted to the DA converter $R_n$ while the counting device $I_n$ is reset and the output of the oscillator 21 is again applied as the input of the counting device $I_n$ whereby the counting cycle is again initiated. The output of the memeory device $S_n$ fed to the DA converter $R_n$, is converted to an analog voltage and then inverted by the inverter $T_n$, whereby the resulting voltage corresponds to the car speed. The square root of the output of the DA converter $N_n$ is calculated by the square root operator $P_n$ and this value is added to the output of the inverter $T_n$ by the adding circuit $M_n$. The resulting value is the sum of the square root of the value of the car spacing information and the car speed information. This signal is passed through the clipper $Q_n$ to the conductive segment $F_n$. This voltage is then used to control the car, as previously described.

Thus in accordance with the present embodiment of this invention, a car spacing control system is provided which considers information as to the distance to the forward or lead car as well as information as to the speed of the forward or lead car, whereby the dense movement of cars can be attained.

In order to obtain information as to the speed of the forward car, an output corresponding to the car spacing is utilized without directly obtaining information concerning the speed of the forward car. Accordingly, it is unnecessary to employ a device for transmitting speed information, whereby the apparatus can be simplified.

Figure 7:
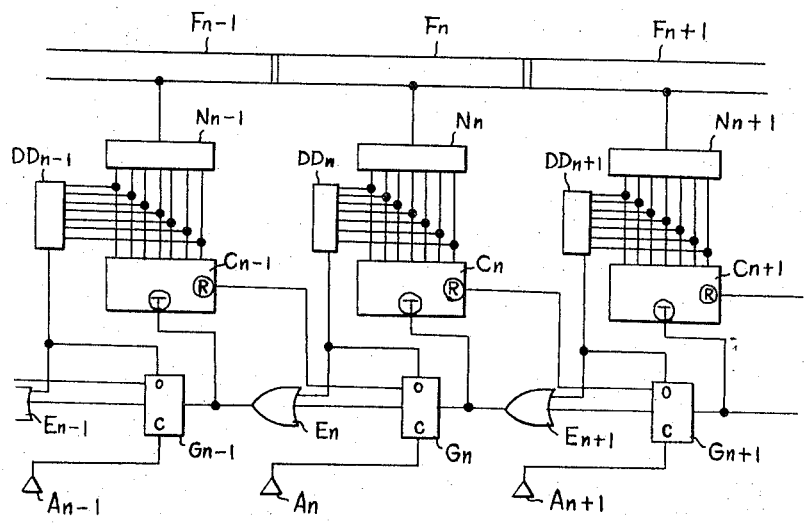
Figure 8:
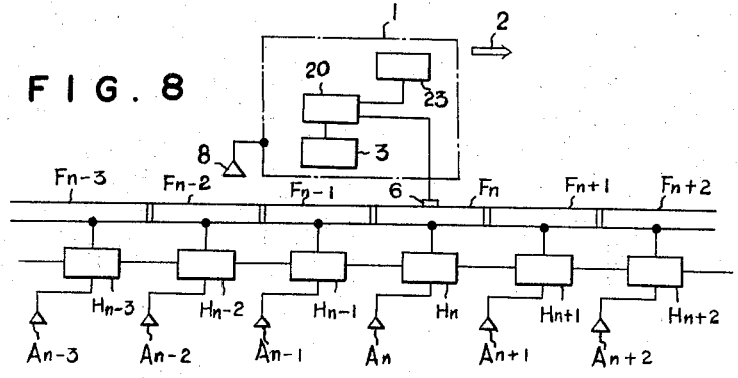
FIG. 8 is a schematic diagram of a control system employing the apparatus of FIG. 7.
Figure 9:
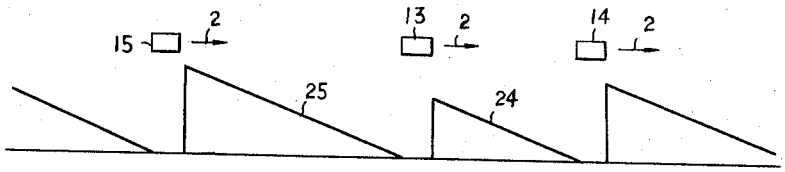
FIG. 9 is a graphical diagram illustrating the operating characteristics of the control system of FIG. 8.

Another embodiment of the present invention is shown in FIGS. 7, 8 and 9 wherein the car speed instructions are provided corresponding to the digital values stored in the counters placed in series along the track or roadway.

Referring now to FIG. 7, a schematic block diagram of this embodiment of the invention is shown, wherein the reference $A_n$ again designates a ground element such as a proximity switch, $G_n$ again designates a gate circuit for transmitting the signal of an OR gate $E_{n+1}$ to the OR gate $E_n$. The gate $G_n$ is opened by a signal from the ground element $A_n$ and is closed by the signal from a decoder $DD_n$. A reset signal is generated by the counter $C_n$, opening the gate $G_n$. The reference $N_n$ designates a D-A converter for generating an analog voltage corresponding to the output of the counter $C_n$, and $F_n$ again designates a conductive segment. The reference T designates the counting input of the counter $C_n$.

FIG. 8 is a schematic diagram of the control system employing the apparatus of FIG. 7. In FIG. 8, the reference numeral 1 designates a car running in the direction of an arrow 2 and 20 designates a control device which controls a driving device or motor 3 by comparing output of a car speed detector 23 with the output of a receiver 6 which contacts the conductive segments $F_n$ as the car runs. The numeral 8 designates a car element fitted on the car which faces the ground elements. The reference $H_n$ designates the control devices shown in FIG. 7 in terms of blocks which are connected in series. FIG. 8 also shows the distribution of signals to the conductive segments $F_n$.

In FIG. 9, which is similar to FIG. 3, the reference numeral 15 designates a rear car, 13 designates a following car and 14 designates a forward or lead car, all of which are running in the direction of arrows 2. The reference numeral 24 designates a graphical representation of the distribution of signals on the conductive segment $F_n$ generated by the forward car 14 and 25 designates a graphical representation of the distribution of signals on the conductive segment $F_n$ generated by the following car 13.

In operation, when the car 1 runs so as to face the car element 8 to the ground element $A_n$, the ground element generates a car passing signal. The gate circuit $G_n$ is closed by this signal, and the counter $C_{n-1}$ is reset to zero. The gate circuit $G_{n-1}$ is opened by the output of the decoder $DD_{n-1}$ to open the gate circuit $G_{n-1}$, and the output thereof is transmitted to the counter $C_{n-2}$ not shown in drawing. When the car 1 moves in the direction of the arrow 2 so as to face the car element 8 to the ground element $A_{n+1}$, the gate circuit $G_{n+1}$ is closed as described above, whereby the counter $C_n$ is reset and the gate circuit $G_n$ is opened by the decoder $DD_n$, while the counter $C_{n-1}$ is activated through the OR gate $E_n$.

These operations are repeated progressively, and the car passing information generated by the passing cars is counted by the counters $C_{n-1}$ and $C_n$ through the gate circuits $G_{n-1}$ and $G_{n+1}$ and the OR gates $E_{n-1}$ and $E_{n+1}$. The output voltage corresponding to the digital output of the counter $C_n$ is transmitted to the conductive segment through the D-A converter $N_n$, and the car speed is received by the receiver 6 contacting the conductive segment. The driving device 3 is then controlled by the control device 20 through a comparison of the car speed signal with the output of the car speed detector 23, whereby the car speed is controlled.

As noted above, the graph in FIG. 9 shows the relationship among the cars and the distribution of signal potential on the conductive segments. The value of the counter $C_n$ immediately after the car passes is zero, and is then progressively increased depending on the distance from the car. A signal representing the speed of the running cars is impressed to the conductive segments, and this signal is transmitted to the cars by the receiver, thereby controlling the cars. If the contact between the receiver and the conductive segments should accidentally be broken, the car speed instruction voltage becomes zero, so as to stop the car. If a certain ground element fails to generate a car passing signal, the speed of cars to the rear is gradually reduced until they stop. Thus, a completely fail-safe system can be constructed using the simple circuits described above.

If the output signal of the D-A converter $N_n$ is differentiated, the speed of the forward car is easily detected. If this differential signal value is impressed on the conductive segments, cars behind the lead car can run at a speed corresponding to the speed of the lead car, and at a proper spacing distance, whereby the high traffic density may be attained. Another embodiments of the present invention is shown in FIG. 10 wherein the speed of the forward car is determined by differentiation of the car spacing signal.

Figure 10:
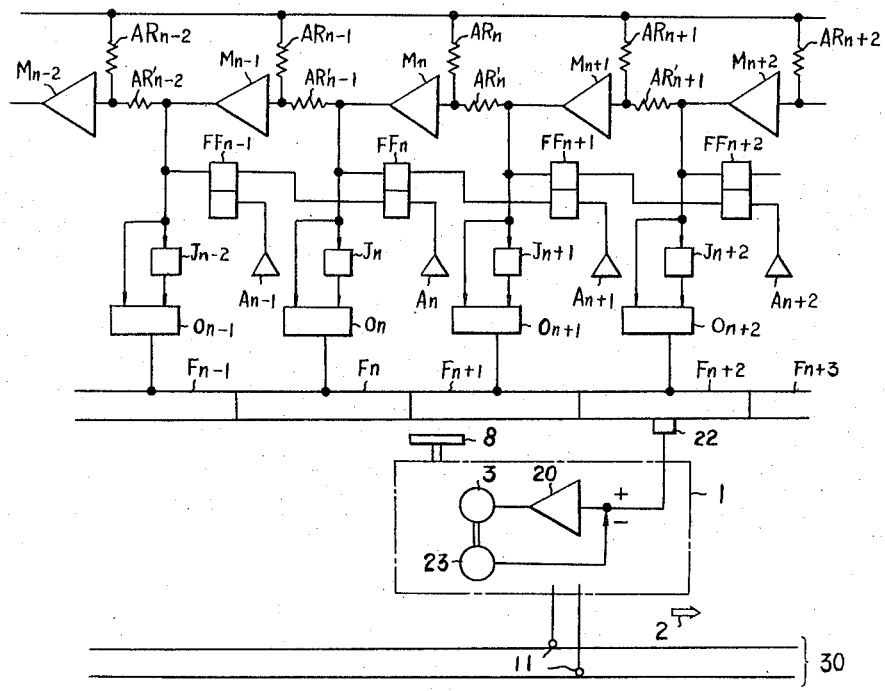
FIGS. 10, 11, 12 and 13 are respectively schematic diagrams of additional embodiments of the apparatus according to this invention.

In FIG. 10, the reference numeral 30 designates a power line carrying a reference voltage $V_s$, ($M_n$) ($n$ = 1, 2, 3 $n$) designates an adding circuit, $AR_n$ designates an addition resistance for adding in the reference voltage $V_s$. The symbol $AR'_n$ designates an addition resistance for adding the output of a forward adding circuit to a rearward adding circuit, and $A_n$ designates the usual ground element. The symbol $FF_x$ designates a flip-flop which is set by the output of the ground element $A_n$ and is reset when a forward flip-flop is set. The reference $J_n$ designates a differentiation circuit for differentiating the output value of the adding circuit $M_n$ while $O_n$ designates an operational device for providing a car speed instruction which is a function corresponding to the output of the adding circuit $M_n$ and the output of the differentiation circuit $J_n$. The reference $F_n$ designates the usual conductive segments for transmitting the output of the operational device $O_n$ to the car. The reference 22 desginates a brush or receiver contacting the conductive segment $F_n$ and 1 designates a car while 20 designates a controller which compares the reception signal of the brush 22 with the output of the car speed detector 23 whereby the motor 3 is driven. Similarly 11 designates a collector for coupling the car to the power line 30 and 2 designates the arrow line showing the forward direction of the car.

In this system, when the car element 8 faces the ground element $A_n$ by movement of the car, the flip-flop $FF_n$ is set by the output of the car element $A_n$, whereby the flip-flop $FF_{n-1}$, which was set, is reset and the output of the adding circuit $M_n$ is shorted to earth potential. Accordingly, the input of the adding circuit $M_{n-1}$ is only the reference voltage $V_s$, whereby the output of this adding circuit is $V_s$.

The input of the adding circuit $M_{n-2}$ is the output $V_s$ of the adding circuit $M_{n-1}$ plus the reference voltage $V_s$, whereby the output thereof is $2V_s$. Thus, the output of an adding circuit placed n zones from the ground element where the car is positioned is $nV_s$, whereby an output voltage corresponding to the distance from the car is produced. However, since the car 1 is progressively moved, the speed of the car can be obtained by differentiating the output corresponding to the distance.

In accordance with the above-mentioned principle, the adding circuit $M_{n-2}$ generates an output corresponding to the distance from the forward car (not shown in drawing), since the flip-flop $FF_{n-2}$ is in the reset condition. The operational device $O_{n-2}$ provides a car speed instruction voltage corresponding to the car spacing and to the output of the differentiation circuit $J_{n+2}$ (the speed of the forward car) to the conductive segment $F_{n+2}$. The car 1 receives the car speed instruction voltage through the brush 22, whereby the motor 3 is controlled by comparing its output with the output of the car speed detector 23, and the car speed is set at the desired value.

The proper speed function for following cars is determined from consideration of the following equations:

$$V_2 = \sqrt{\alpha V_1^2 + \beta(L - L_o)} \text{ (ideal function)}$$

$$V_2 = K_1 V_1 + K_2 \sqrt{(L - L_o)} \text{ (approximate function)}$$

$$V_2 = K_3 V_1 + K_4 (L - L_o) \text{ (simplified approximate function)},$$

wherein $K_1$, $K_2$, $K_3$ and $K_4$ are respectively constant. Any one of these three equations can be applied for the preliminary purpose of determining $V_2$ as a function of $V_1$ and $L - L_o$.

Various alternatives of the above described system are possible. For example, it is possible to determine the car spacing as a digital signal instead of an analogue signal. Furthermore, a non-contacting device such as a loop-antenna can be used instead of the brush receiver described above. In this case, the car speed information is transmitted using frequency discrimination. It is also possible to provide a differentiation device and an operator on the car for generating a speed signal. In this case, a signal corresponding to the relative car speed is differentiated. Accordingly, the speed of the forward car can be obtained by adding to the relative speed the speed of the following car. In this embodiment, the speed of the following car is determined by detecting the distance from the forward car using either a digital or an analogue system and differentiating distance signal with respect to time so as to detect the speed of the forward car, the determining speed of the following car depending upon both specific functional values. It is thus possible to attain high traffic densities without using a detector for measuring the speed of the lead or forward car, and without need for transmitting such information.

Figure 11:
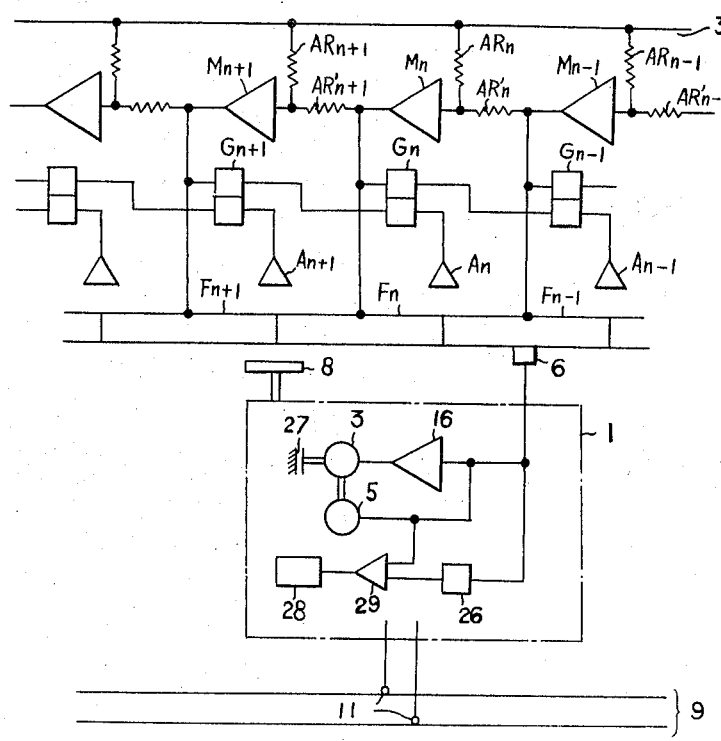

A further embodiment of the present invention shown in FIG. 11 which is similar to the embodiment of FIG. 10 except for the addition of devices for wheel slip and providing emergency braking. In the embodiment of FIG. 11, wheel slip is detected by a simple means so as to control emergency brakes, such as shoe-brakes, which is directly actuated between the car and the rail track or roadway by catching a guide rail, whereby reduction in vehicle speed is increased above normal, to improve the safety of high density traffic movement.

In FIG. 11, the reference numeral 1 designates a car, 26 designates a differentiating device, 16 designates an amplifier and 3 designates a driving device or motor. Similarly, 5 designates a speed dynamo or tachometer generator, 27 designates the usual brake while 29 designates a comparison device and 28 designates an emergency brake. The numeral 6 designates a receiver, 8 designates a car element while 9 designates a feed or power line and 11 designates a collector contacting to the feed line 9. Furthermore, $A_n{}^2/_1$, $A_n$, $A_{n-1}$ ... designate the usual ground elements, $G_{n+1}$, $G_n$, $G_{n-1}$ ... designate gates for passing or stopping outputs of various adding circuits in response to signals from the ground elements $A_{n+1}$, $A_n$... The symbols $M_{n+1}$, $M_n$, $M_{n-1}$... designate adding circuits for generating outputs corresponding to the distance from the forward or lead car and $(AR'_{n+1})$, $(AR'_n)$, $(AR'_{n-1})$... designate addition resistors by which the output of each adding circuit is applied as an input to the next stage, while $AR_{n+1}$, $AR_n$, $AR_{n-1}$... designate addition resistors through which the constant or reference voltage on the line 33 is applied as an input to the adding circuits. The symbols $F_{n+1}$, $F_n$, $F_{n-1}$... designate the usual insulated conductive segments to which the outputs of the adding circuits $M_{n+1}$, $M_n$, $M_{n-1}$ are applied.

In operation an output voltage proportional to the distance from the forward car is impressed on the conductive segment $F_{n-1}$ and the voltage of this segment is received by the receiver 6 and fed to the driving device 3 through the amplifier 16. The driving device or motor 3 is thus driven, and the car is moved under feed-back control by the output voltage of the speed dynamo. As previously described with reference to FIG. 10, integral multiples of the constant voltage on the line 33 are applied to the segments $F_{n+1}$, $F_n$, $F_{n-1}$... corresponding to distance from the lead car. When the car element 8 approaches and faces the ground element $A_n$, the output of the ground element $A_n$ is supplied to the gate $G_n$ and the output of the adding circuit $M_n$ is zero. Simultaneously, the gate $G_{n+1}$, which was closed by the car element 8 facing the ground element $A_n$, is opened whereby an output voltage corresponding to the distance from the lead to the following car is generated in the adding circuits. The power or regenerative control of the driving device 3 is provided by the amplifier 16 depending upon the difference between the output of the speed dynamo 5 and the value of specific speed signal from the receiver 6. At the low speeds providing less regenerative control, the usual brake 27 is alone used to control the car speed so as to have substantially the same deviation as the running speed increases beyond a prescribed threshold, activated by appropriate circuitry. Accordingly, if a following car approaches a forward car with slipping or locked wheels, for example, even though the usual damping or braking device is actuated and in normal condition, an output is produced by the differentiating device 26 in spite of a zero output from the speed dynamo, whereby the emergency brake 28 is actuated to prevent a rear-end collision. In this embodiment, the usual voltage corresponding to the car spacing distance is impressed on the conductive segments. However, it is also possible to impress a voltage corresponding to a combination of the forward car speed and the car spacing. The voltage corresponding to the car spacing is provided to the receiver through contact with the conductive segments. Alternatively, it is possible to transmit the car spacing information using a non-contact system, employing a loopantenna for example.

In the illustrated embodiment, the main electric power is supplied through the power line 9, however it is also possible to use battery power or conventional fuel powered engine as a driving source.

In accordance with this embodiment of the invention, reducing the speed of car may be substantially increased to improve the safety of high density traffic movement. Wheel slip can easily be detected by differentiating the output of the speed dynamo.

Figure 12:
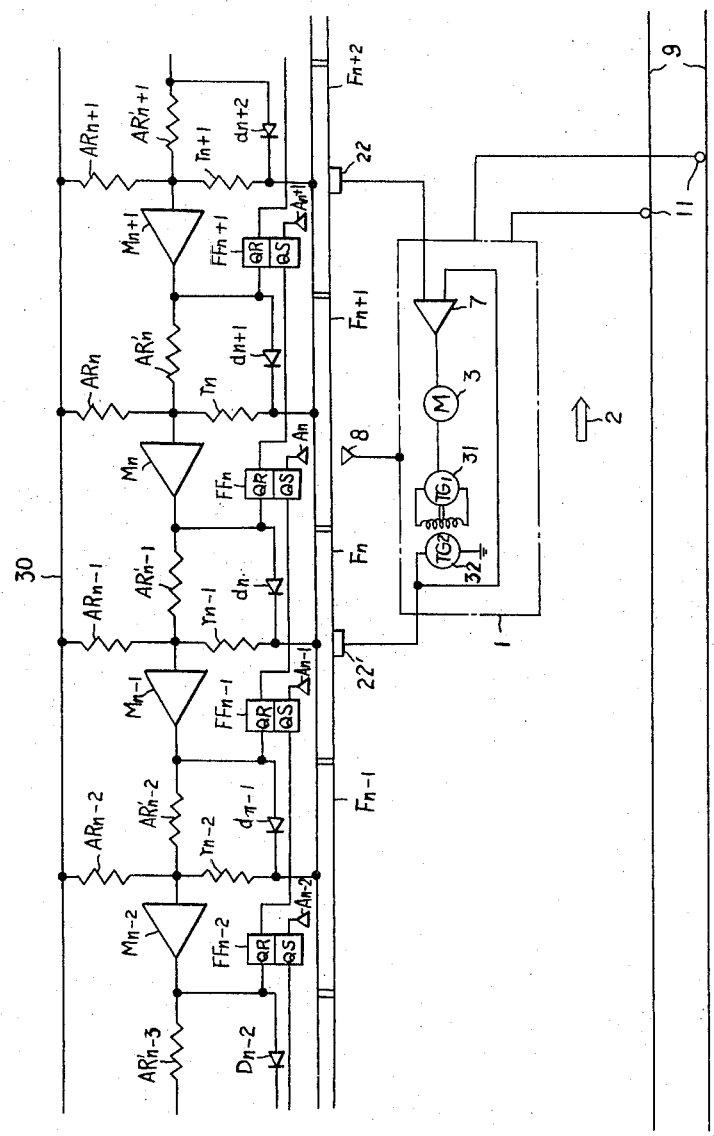

Yet another embodiment of the present invention is shown in FIG. 12 wherein a device is provided to control the car spacing or the stopping distance. In general, the stopping distance is proportional to square of car speed, provided that the braking or deceleration is contstant. In order to stop a car at a specific position, it is necessary to move the car at a speed proportional to square root of the distance from its actual position to the desired stopping position. When a plurality of cars are running on one line, it is necessary to move the cars at a speed proportional to square root of the sum of the speed of the forward or lead car and the distance to the lead car.

Referring now to FIG. 12, the reference numeral (30) designates a power line supplying the reference voltage $V_s$ and $AR_n$ designates the addition resistor for adding in the reference voltage $V_s$ while $AR'_n$ designates an addition resistor for adding the output of the forward adding circuit $M_n$ to the following addition device $M_{n-1}$ and $\gamma_n$ designates an addition resistor for adding in the voltage on the conductive segment $F_n$. The symbol $FF_n$ designates a flip-flop in which the output of the corresponding addition resistor $AR_n$ is short circuited to earth potential and simultaneously the rearward flip-flop $FF_{n-1}$ is reset, while the output of the corresponding addition resistor $AR_n$ is open circuited due to the reset condition.

The reference $d_n$ designates a diode which transmits the output of the adding circuit $M_n$ to the conductive segment, while $A_n$ designates the usual ground element which detects the passing car, whereby the flip-flop $FF_n$ is reset. The reference numeral 1 designates the car and 22 designates a brush for transmitting the voltage of the conductive segment to the car while 22 designates a brush for transmitting the output of a second speed meter 32, which generates an output corresponding to the square of the car speed, to the conductive segment $F_n$. Similarly, 3 designates the usual motor for driving the car 1 and 31 designates a first speed meter for detecting the actual car speed. The numeral 7 designates a controller for driving the motor 3 so as to equate the output of the second speed meter 32 with that of the voltage received by the brush 22. Similarly, 2 designates an arrow showing the direction of the car and 9 designates a power line for supplying the power required for driving the car while 11 designates a collector power pick-up.

In this system, the speed of the forward car is again designated as $V_1$ and the speed of the following or rear car as $V_2$, while the car spacing is designated L. Accordingly, the following equation applies:

$$V_2^2 = K_1 V_1^2 + K_2 L$$

wherein $K_1$ and $K_2$ are constant. In the system shown in FIG. 12, the ground element $A_n$ faces the car element 8 and generates a car detection signal which sets the flip-flop $FF_n$, whereby the output of the adding circuit $M_n$ is reduced to earth or ground potential, and the rearward flip-flop $FF_{n-1}$ is reset. Accordingly, the input of the adding circuit $M_{n-1}$ is the reference voltage $V_s$ plus the output of the second speed meter 32. The output of the adding circuit $(M_{n-1})$ is thus $(V_s + K_1 V_1^2)$. Similarly, the input of the adding circuit $(M_{n-2}$ is the reference voltage $V_s$ plus the output of the adding circuit $M_{n-1}$, and the output of the adding circuit $M_{n-2}$ is thus $(2V_s + K_1 V_1^2)$. The voltage on the conductive segment n zones behind the car is thus the sum of the square of the speed of the forward car and a value proportional to the distance from the car.

The brush 22 receives the information concerning the forward car, while the first speed meter 31 generates an output proportional to the car speed. When the second speed meter 32 is used as the field power source of a separately excited generator, and the first speed meter 31 is also utilized, a signal corresponding to the square of the car speed is provided to the second speed meter when the field is not saturated. The motor is driven so as to equate the signal corresponding to the car speed to the received signal by comparing them in the controller 7. Accordingly, the above-mentioned equation of the speeds of the forward car and the rearward or following car is formed.

The adding and comparing steps can be accomplished by a digital system. Also, in order to square the car speed an analog squaring circuit can be used. It is also possible to use a digital multiplier. In the present embodiment, the car speed is proportional to the square root of the distance required to stop. It is also possible to obtain substantially the same effect using the square root operation by the following technique. The square of the car speed is provided by a simple device, and this value is compared with the car spacing information by feeding back this value without any square root operation. The car speed is then controlled so as to be equal to them.

Figure 13:
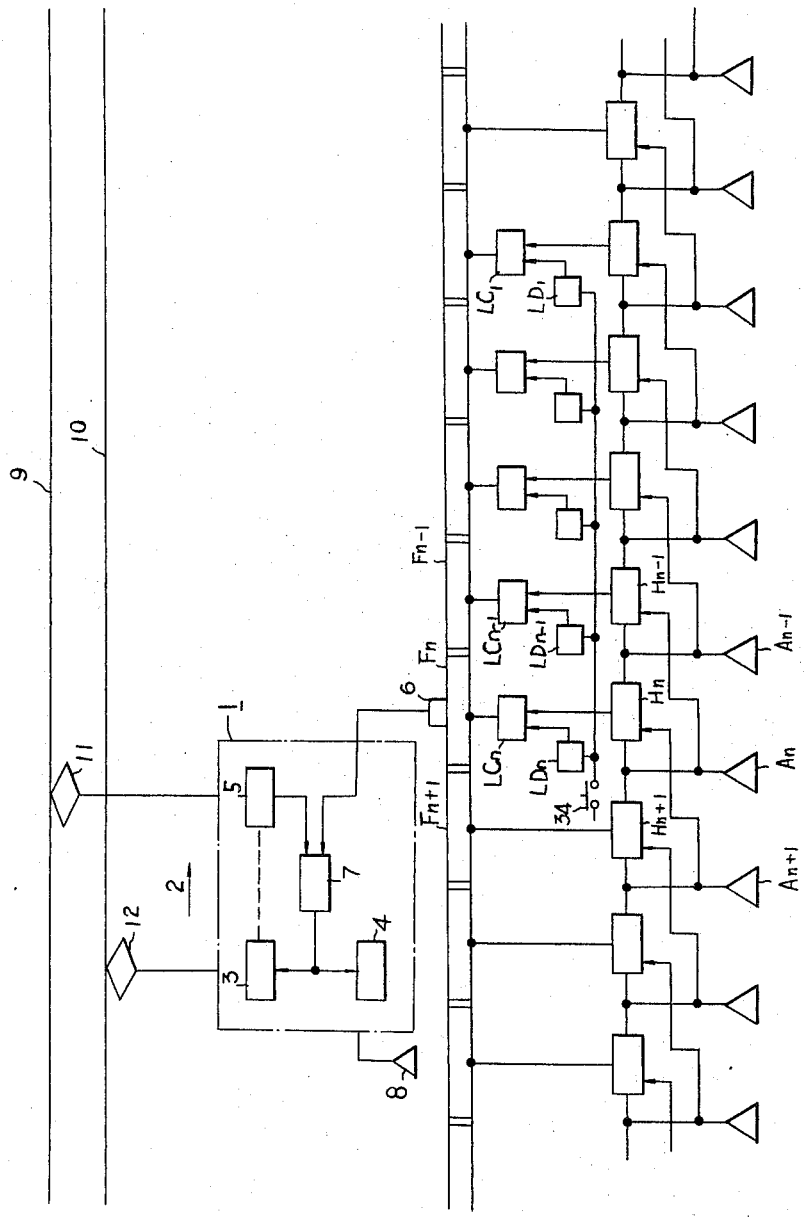

In the embodiment shown in FIG. 13, a rational movement is provided when the object car is stopped in a stopping instruction zone. In general, in order to stop a car at a desired position in low density traffic, the car stopping instruction can be provided only when no car is in the stopping instruction zone. However, in high density traffic, running cars sometimes cannot be stopped in a particular zone, and thereby pass through the zone due to their speed. In the present embodiment, the car in the stopping instruction zone passes it, while only the car to the rear of the stopping instruction zone is given the car stopping instruction, whereby rational car control is provided, without providing a stopping instruction to the car in the stopping instruction zone, permitting that car to pass through the zone. In FIG. 13, the reference $A_n$ designates the usual ground element and $H_n$ designates a voltage controller generating a voltage corresponding to the car speed and spacing while $LC_n$, $LC_{n-1}$ $LC_1$ designate limiting devices for moving only the object car under the voltage of the car speed limiting voltage impressing devices $LD_n$ $LD_{n-1}$. . . $LD_1$ by comparing the voltage of the voltage controller $H_n$ with the voltage of the car speed limiting voltage impressing devices $LD_n$ $LD_{n-1}$. . . $LD_1$, which have a gradually diminishing voltage, and are placed in the stopping instruction zone. The reference $F_n$ designates the usual conductive segment to which the final output voltage is impressed. The reference numeral 34 designates a car stopping instruction switch which is closed when the car stopping instruction is provided. The reference numeral 1 designates the car running in the direction of the arrow 2 along an induction track or roadway. Similarly, 3 designates a driving device or motor for the car, while 4 designates a damping or braking device and 5 designates a speed dynamo or tachometer generator and 6 designates a receiver fitted front of the car so as to progressively contact the conductive segments $F_{n+1}$, $F_n$, $F_{n-1}$. . . .

The reference numeral 7 designates a speed controller for controlling the driving device 3 and the damping device 4 so as to substantially equate the voltage from the receiver 6 with the output voltage of the speed dynamo 5 by comparing them. The numeral 8 designates a car element, such as a metal piece fitted to the back of the car, which progressively faces the ground elements $A_{n+1}$, $A_n$ $A_{n-1}$. . . while 11 and 12 designate collectors contacting the power feed lines 9 and 10.

Figure 14:
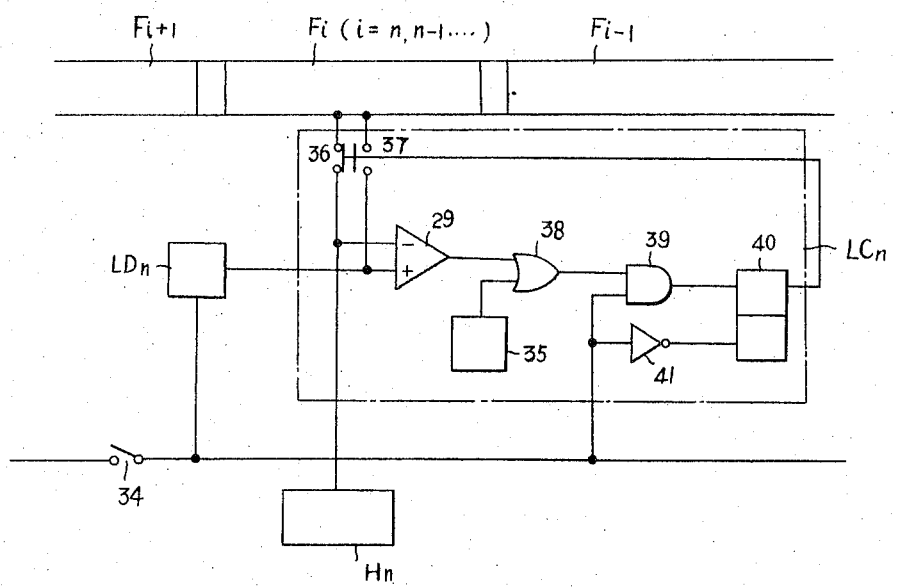
FIG. 14 is a block diagram of an output limiter employing the apparatus according to this invention.

FIG. 14 shows in greater detail the structure of the limiting device $LC_n$ of FIG. 13. In FIG. 14, the running output limiting device $LC_n$ is shown as including a voltage control gate 35, a normally closed switch 36 and a normally opened switch 37. These switches are actuated only when a comparison device 29, an OR gate 38, an AND gate 39, a flip-flop 40, a NOT gate 41 and the conductive segments in the stopping instruction zone are activated. More particularly, in operation, when the car 1 is moved to the conductive segment $F_n$ after closing of the stopping instruction switch 34, as shown in FIG. 13, and the forward car is in the stopping instruction zone (the forward car is not shown in drawing), and the following operation then occurs. The output voltage of the voltage control device $H_n$, generating a running voltage corresponding to the car spacing, is compared in the comparison device 29 with the voltage generated by the car speed limiting voltage impressing device $LD_n$, which is activated by operation of the switch 13. When the output voltage corresponding to the car spacing is greater than the car speed limiting voltage, the output of the comparison device 29 is "L" (i.e., low) and the normally closed contact 36 is kept in the closed condition. At the same time the output voltage of the voltage control device $H_n$ is directly impressed on the conductive segment $F_n$, and the forward car is run without stopping at the position predetermined for the object car.

Figure 15:
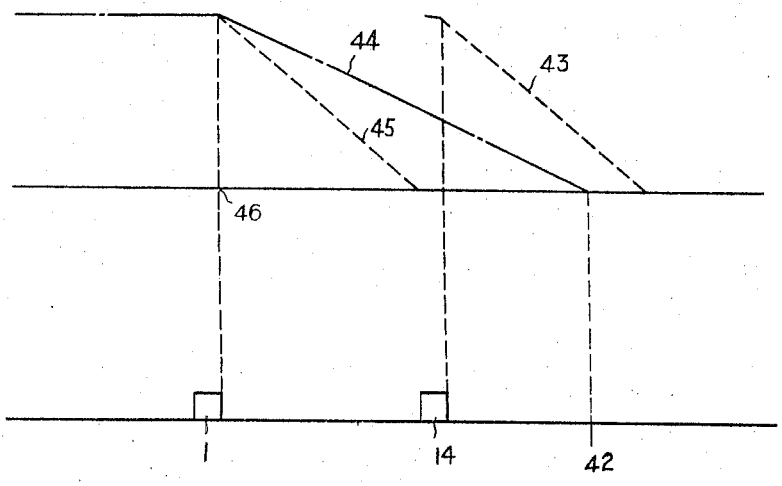
FIG. 15 is a graphical illustration of the operating characteristics of the output limiter of FIG. 14; and, FIG. 16 is a schematic diagram of yet another embodiment of the apparatus according to this invention.

With regard to the object car, the same voltages are compared by the comparison device 29 as mentioned above. However, the car speed limiting voltage is higher than the output voltage corresponding to the car spacing, and the output of the comparison device is "H" (i.e., high). This output actuates the flip-flop 40 by passing through the AND gate 39 and the OR gate 38 and the switch 34, whereby the normally opened switch 37 is closed. Accordingly, the output of the car speed limiting voltage impressing device $LD_n$ is impressed through the switch 37 on the conductive segment $F_n$. The object car then slows according to the car speed limiting voltage to smoothly stop at the predetermined position. This relationship is shown in FIG. 15. The forward car 14 running according to the voltage 43 corresponding to the car spacing without the effect of the car speed limiting voltage 44, passes through the stopping zone without stopping at the predetermined position 42. However, when the object car 1 passes through the place at which speed reduction is initiated, the object car is run according to the car speed limiting voltage 44 without receiving the voltage 45 corresponding to the car spacing and is stopped at the desired position 42.

In the illustrated case, no forward car is present in the car speed limiting zone when the object car passes through the place at which speed reduction is initiated. In this case, the forward car is far from the object car, and accordingly all of the conductive segments $F_n$ in the car speed limiting zone are in the condition "H," and the voltage gate 35 is actuated. Accordingly, when the object car passes through the place at which speed reduction is initiated, the switch 34 is actuated, and the normally open contact 37 is closed by the flip-flop 40. The output generated by the car speed limiting voltage impressing device $LD_n$, is impressed on the conductive segment $F_n$ whereby the object car is smoothly stopped at the desired position. As stated above, in the present embodiment, the system comprises a controlling device generating an output voltage corresponding to the car spacing, and the car stops under control of a speed limiting voltage generator a specific distance in front of the place at which the stopping signal is applied. Only the object car is stopped at the predetermined stopping place by the car stop speed limiting voltage, while the forward car is not stopped, but is moved without the effect of the car stop speed limiting voltage, whereby rational movement of all cars is attained.

Figure 16:
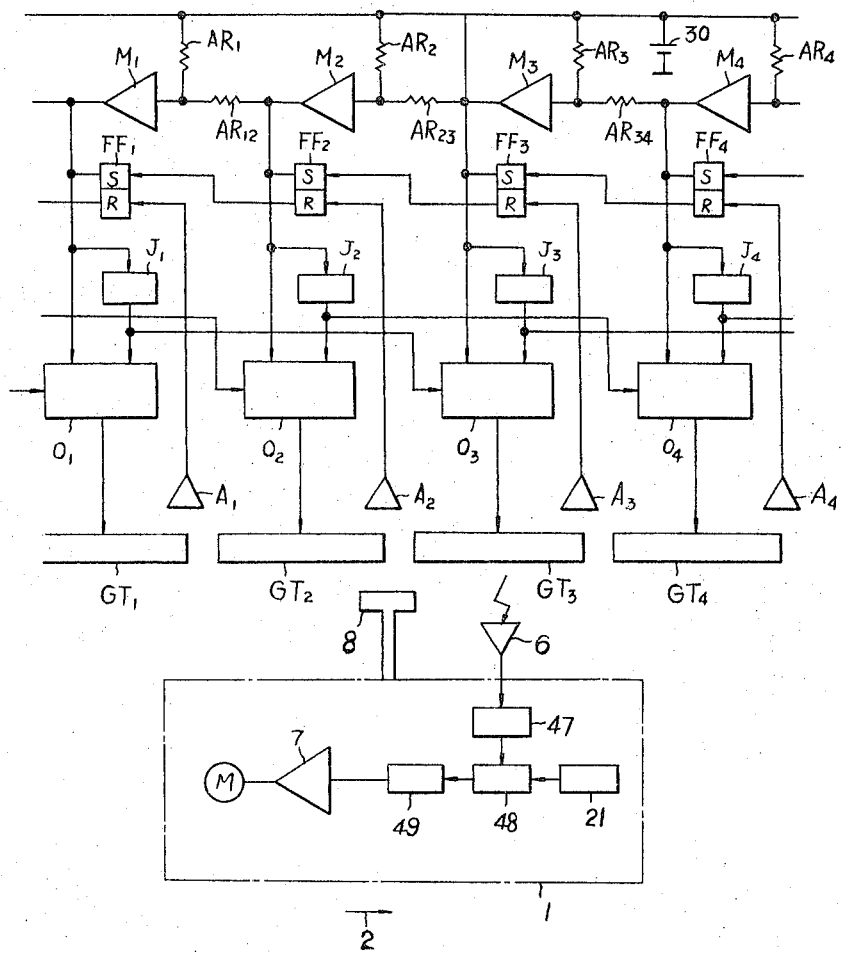

Another embodiment is shown in FIG. 16 wherein high density movement of cars can be attained by controlling the speed of the following car depending upon the speed of the forward car and the car spacing. In the high speed movement of cars, it is possible to provide a high density of movement with a small car spacing depending upon the difference in the damping or stopping distances of the cars. However, in providing such high density movement, certain difficulties may arise if only a several-step speed instruction is used. It is therefore necessary to provide many steps or a continuous speed instruction. In the latter case, an expensive and complicated transmission device is disadvantageously required. In order to overcome such disadvantages, accelerating and stopping instructions may be transmitted from the ground, as shown in FIG. 16.

In FIG. 16, the references $M_1$, $M_2$, $M_3$ etc. designate adding circuits connected in series through the series addition resistors $AR_{12}$, $AR_{23}$, etc. The input terminal of each adding circuit is connected through the addition resistors $AR_1$, $AR_2$, $AR_3$ etc., to the constant voltage source 30. The references $FF_1$, $FF_2$, $FF_3$ etc., designate flip-flops which are respectively connected to the output terminals of the adding circuits $M_1$, $M_2$, $M_3$, etc. The reset input terminals of the flip-flops are respectively connected to the ground elements $A_1$, $A_2$, $A_3$ etc., which are placed with a specific interval along the track, path or roadway.

The references $J_1$, $J_2$, $J_3$ etc, are respectively connected to outputs of the adding circuits $M_1$, $M_2$, $M_3$ etc. and are differentiating devices for detecing the rate of change of the output of the adding circuits. As explained below, the output of the adding circuits changes in states. Accordingly, the differentiating devices can detect the average rate of change by measuring the changing output of the adding circuits over a selected interval, for example. The references $O_1$, $O_2$, $O_3$ etc. are respectively operators which receive the outputs of the adding circuits $M_n$ where $n = 1, 2, 3...$ and the output of the differentiating devices $J_n$, where $n = 1, 2, 3,...$ as inputs, and the outputs thereof are transmitted to the ground transmission devices $GT_1$, $GT_2$, $GT_3$, etc.

The reference numeral 1 designates a car running in the direction of the arrow 2 while 8 designates a car element or transmitter (such as metal piece) which faces the ground element $A_n$, and 6 designates a car receiver for receiving signals from the ground transmitter $GT_n$. Similarly, 47 designates a decoder for reading the content of signal received at the car and 21 designates an oscillator, while 48 designates a reversible counter for addition, substraction, or no counting depending upon the content of the decoder 47 which receives output pulses from the oscillator as its input. The reference numeral 49 designates a DA converter for converting the binary scale output of the counter to an analogue signal, and 7 designates a speed controller for controlling the speed of motor M by amplifying the output of the DA converter.

In this system, when the car 1 moves in the direction of the arrow 2, the car transmitter 8 progressively faces the various ground receivers $A_n$. When the car transmitter 8 faces the ground receiver $A_2$ as shown in FIG. 16, the flip-flop $FF_2$ is reset to cause the output of the adding circuit $M_2$ to be zero, and the flip-flop $FF_1$ is set. When the ground receiver $A_3$ is faces the car transmitter 8, the flip-flop device $F_3$ is reset to cause the output of the adding circuit $M_3$ to be zero, and the flip-flop device $FF_2$ is set. The adding circuits cumulately add the output of the constant voltage source 30 as described above so as to provide progressively higher outputs along the track or roadway.

During the time interval between the times at which the car transmitter 8 passes one ground element or receiver $A_n$ and the next ground element or receiver $A_{n+1}$, the flip-flop $FF_n$ is reset. Accordingly, the output of the adding circuit $M_n$ at the position of the car, is zero. The output of adding circuits behind the car progressively increases, as mentioned above. Accordingly, the output of the adding circuits $M_3$ is proportional to the distance L between the forward car and the following car 1, and the differential output is proportional to the speed $V_1$ of the forward car. The differential output of the adding circuit $M_1$ is proportional to the speed $V_2$ of the car 1. The operator $O_3$ receives an input corresponding to the car spacing L, the speed $V_1$ of the forward car, and the speed $V_2$ of the rearward car. The transmission frequency of the ground transmitter $GT_3$ is controlled in accordance with the operator output according to the following equations:

$V_2^2 > K_1L + K_2V_1^2$ . . . a first frequency $F_1$ is transmitted, $V_2^2 = K_1L + L_2V_1^2$ . . . a second frequency $F_2$ is transmitted, $V_2^2 < K_1L + K_2V_1^2$ . . . a third frequency $F_3$ is transmitted.

The decoder 47 controls the counter 48 depending upon the frequency detected by the car receiver 6, as follows:

When the first frequency $F_1$ is received. . .
substraction or counting in reverse;
When the second frequency $F_2$ is received... no counting;
When the third frequency $F_3$ is received. . .
addition or counting in the forward direction.

As the result, the speed controlling device 7 controls the motor so as to reduce, maintain constant, or increase the speed, whereby the car runs in accordance with the equation:

$$V_2^2 = K_1L + K_2V_1^2$$

The operational equation above is the optimum for the high density movement. However, it is possible to control the car in accordance with the approximate equation $$V2 = K_3L + K_4V_1,$$

as was described above. It is also possible to provide quick acceleration and deceleration or gradual acceleration or deceleration depending upon the magnitude of the speed deviation signal along with the accelerating and decelerating instruction.

Various alternative structures are possible. For example, instead of the oscillator 21, the counter 48 and the DA converter 49, the variable resistance for a specific speed can be controlled by a pilot motor which is reversibly driven depending upon the output of the decoder 47. The speed controlling device 7 can also be various types of devices, such as an open loop, multi-step notch controller, or a closed loop continuous controller.

As it is clear from the description above, in accordance with the present embodiment, the speed of each car is measured on the ground. Accordingly, the car speed with respect to the ground can be accurately measured regardless of changing wheel size.

As the speed deviation output corresponding to the difference in the speeds of the forward following cars, and the car spacing are transmitted to the car as accelerating and decelerating instructions according to the present invention, high density car spacing and control can be attained. The speed setting device can be mounted on the car, whereby multi-stage or continuous specific speed settings can be attained.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for controlling a vehicle comprising:

distance measuring means for measuring the distance between a lead vehicle and a following vehicle and for generating a signal proportional to said distance;

speed measuring means for measuring the speed of said lead vehicle and for generating a signal proportional to said speed;

circuit means for producing an output signal means for providing an output signal proportional to the square root of the sum of said signal proportional to said distance and the square of said signal proportional to said speed; and, control means for controlling said vehicle in response to said output signal from said circuit means wherein said speed measuring means comprises:
a moving element coupled to said vehicle;
a plurality of ground elements spaced a predetermined distance apart for generating vehicle passing signals as said moving element passes each of said ground elements;
oscillator means for generating a periodic output signal having a period shorter than that of said vehicle passing signals;
counting means for repeatedly counting said oscillator output during the presence of said vehicle passing signal; and
memory means for storing the maximum counts accumulated in said counting means.

2. An apparatus for controlling a vehicle as in claim 1, wherein said speed measuring means comprises:
a moving element coupled to said vehicle;
a plurality of spaced ground elements for generating vehicle passing signals as said moving element passes each of said ground elements;
counting means for counting said vehicle passing signals; and,
limiting means for limiting the counting interval of said counting means.

3. An apparatus for controlling a vehicle comprising:

distance measuring means for measuring the distance between a lead vehicle and a following vehicle and for generating a signal proportional to said distance;

speed measuring means for measuring the speed of said lead vehicle and for generating a signal proportional to said speed;

circuit means for providing a signal proportional to the square root of said signal proportional to said distance; and further providing a signal proportional to the sum of said signal proportional to said speed and said signal proportional to said square root;

control means for controlling said vehicle in response to said output signal from said circuit means;

wherein said speed measuring means comprises a moving element coupled to said vehicle;

a plurality of ground elements spaced a predetermined distance apart for generating vehicle passing signals as said moving element passes each of said ground elements;

oscillator means for generating a periodic output signal having a period shorter than that of said vehicle passing signal;

counting means for repeatedly counting said oscillator output during the presence of said vehicle passing signal; and memory means for storing the maximum counts accumulated in said counting means.

4. An apparatus for controlling a vehicle as in claim 3, wherein said speed measuring means comprises:

a moving element coupled to said vehicle;

a plurality of ground elements placed specific distances apart for generating vehicle passing signals as said moving element passes each of said ground elements;

counting means for counting said vehicle passing signals; and, limiting means for limiting the counting interval of said counting means.

5. A system for controlling vehicles comprising:

speed measuring means for measuring the speed of a vehicle and for generating a signal proportional to said speed;

distance measuring means for measuring the separation between said vehicle and a lead vehicle and for generating a signal proportional to said separation;

operator means for generating a control signal in response to said signals proportional to said speed and said separation;

a reference voltage source;

adding circuit means coupled to said reference voltage source for developing an output signal proportional to an integral multiple of said reference voltage;

a plurality of individually insulative conductive segments carrying a signal for controlling said vehicle;

receiver means carried by said vehicle for detecting said signal carried by said conductive segments;

means coupled to said vehicle for generating a signal which is proportional to the square of said vehicle speed; and transmitting means for transmitting said signal proportional to the square of said vehicle speed to said conductive segments.

6. A system for controlling vehicles as in claim 5, further comprising:

a plurality of spaced ground elements for detecting the passage of vehicles;

a plurality of counters associated with said plurality of ground elements for counting the outputs thereof;

a plurality of series connected gate circuit means controlled by the outputs of said ground elements;

vehicle speed setting circuit means for setting the speed of said vehicle corresponding to the outputs of said counters; and, means for transmitting the output of said vehicle speed setting circuit means to said vehicle.

7. A system for controlling vehicles as in claim 5, further comprising:

a fixed, ground mounted structure;

emergency braking means coupled to said vehicle, said emergency braking means acting directly between said vehicle and said fixed, ground mounted structure; and, brake control means for controlling the actuation of said emergency braking means, said brake control means including means for differentiating said signal proportional to said separation, and means for comparing said differentiated signal with said signal proportional to said speed.

8. A system for controlling vehicles as in claim 5, wherein:

said means for generating a signal which is proportional to the square of said vehicle speed comprises a motor, and said speed measuring means provides the field input power for said motor.

9. A system for controlling vehicles as in claim 5, further comprising:

limiting means for limiting the output of said operator means, whereby the speed of said vehicle is limited to a preset maximum value.

10. A system for controlling vehicles as in claim 5, wherein:

said operator means comprises a plurality of control devices for controlling a plurality of vehicles; and further comprising communication means for communicating speed regulating signals among said vehicles.

11. A system for controlling vehicles as in claim 5, wherein:

said speed measuring means includes differentiating means for detecting and for generating an output signal proportional to changes in said signal proportional to said separation.

12. A system for controlling vehicles as in claim 11, further comprising:

a reference voltage source;

adding circuit means coupled to said source for developing an output signal proportional to an integral multiple of said reference voltage;

a plurality of conductive segments, each insulated from the others, and arranged along a prescribed path; and wherein said operator means generates said control signal in response to said output signals of said differentiating means and said adding circuit means, and said control signal is applied to said conductive segments.

* * * * *